Oct. 7, 1952 — R. C. ROI — 2,612,923

HOUSEHOLD IMPLEMENT FOR COMMINUTING FOODSTUFF

Filed June 19, 1950

INVENTOR

RENE CHARLES ROI

BY Baldwin + Wight his ATTORNEYS

Patented Oct. 7, 1952

2,612,923

UNITED STATES PATENT OFFICE 2,612,923

HOUSEHOLD IMPLEMENT FOR COMMINUTING FOODSTUFF

René Charles Roi, Paris, France, assignor to Societe Civile d'Etudes pour la Fabrication de Produits Industriels Manufactures (S. E. P. I. M.), Paris, France, a corporation of the French Republic Application June 19, 1950, Serial No. 168,873
In France July 4, 1949

4 Claims. (Cl. 146—175)

My invention has for its object improvements in household implements for comminuting foodstuff and in particular a method and means for removably securing the perforated or the like bottom of containers used for household work to the body of the containers. This is chiefly of interest for the grid-shaped or perforated bottoms of implements used for sifting, mincing and crushing purposes and including a pounding or compressing member driven into rotation by a crank and held elastically in contact with the grid-shaped or perforated bottom.

It is important in order to reach the desired result that the grid may not be driven into rotation by the crusher member. Various methods have been proposed for this purpose among which may be mentioned the provision on the periphery of the grid or bottom of a projection or depression adapted to engage a corresponding depression or projection provided in the cooperating portion of the container body. Said arrangement shows the drawback of requiring some care to be exercised by the user in order to provide for proper registration between the two above-mentioned interlocking means.

The same is the case when the container body ends with a regular prismatic part provided with a flange at 90° therewith for engaging the cooperating prismatic flange on the grid or bottom of the container body.

Now, according to my invention, the lower part of the container assumes the shape of a regular frustum of a pyramid, the cross-section of which decreases gradually from top to bottom and ends with an inturned flange while the grid-shaped bottom is provided with a peripheral flange assuming the shape of a frustum of a pyramid mating with the inside of the container body.

My invention is further characterized by the fact that the flat surfaces of the grid flange are connected with one another through rounded edges.

By reason of these arrangements, it is sufficient to drop the grid into its housing without heeding the angular setting assumed by it with reference to the container: if the lateral ridges of the grid engage the flat inner surfaces of the lower part of the container body, the downward movement of the grid is performed along a helical path and the grid engages automatically its position of use.

In practice, satisfactory results are obtained with a frustum of a pyramid, the base of which includes a number of sides higher than four.

I have illustrated by way of example in accompanying drawings a preferred embodiment of my invention. In said drawings.

Figure 1:
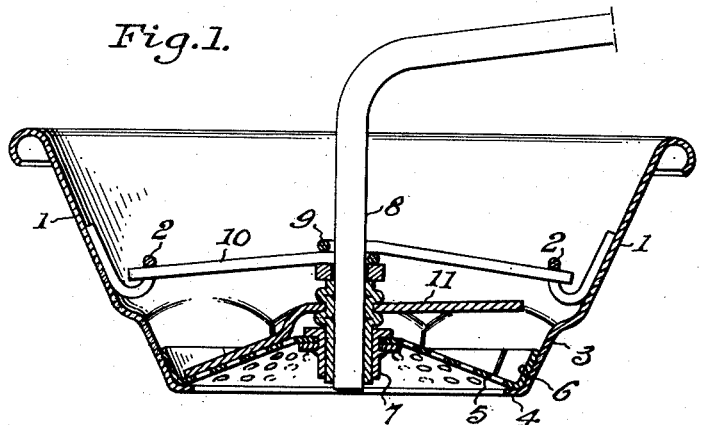
Fig. 1 is an axial cross sectional view of a vegetable presser provided with a removable grid mounted in accordance with my invention.
Figure 2:
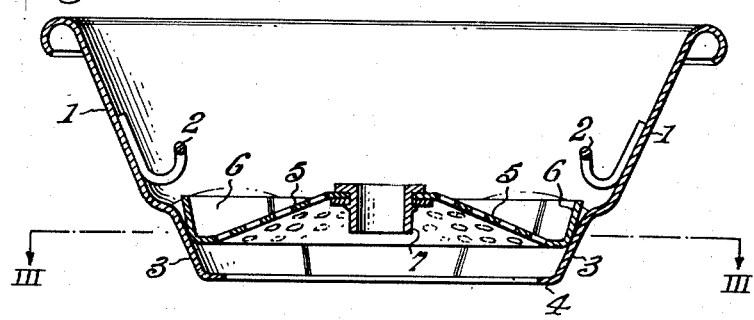
Figs. 2 and 3 are respectively a transversal cross-section and a horizontal cross-section along line III—III of Fig. 2 of the grid positioned in a manner such that its ridges may engage the flat surfaces of the shell.
Figure 3:
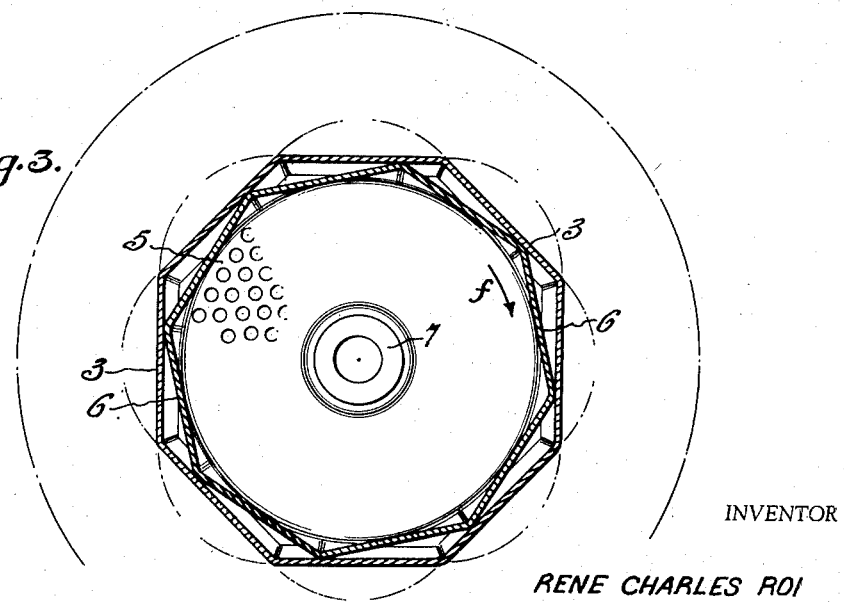

Referring to said drawings, 1 designates the frusto-conical shell of a vegetable presser provided in the usual manner with an upper rolled up edge and two diametrically opposed lugs 2. Now, according to my invention, the shell extends at its lower end under the form of a frusto-pyramidal wall 3, the horizontal cross-section of which is e. g. a regular octagon, the apex of which is located underneath the container and that ends with an inturned flange 4.

Inside the lower part of the shell is removably fitted a frusto-pyramidal flange 6 of the grid-shaped bottom 5 of the vegetable crusher, provided in its centre with a hub 7. The shape of the flange 6 matches that of the shell: it should be noticed that the flat surfaces of the flange 6 are connected with one another through rounded surfaces.

The hub of the grid carries in the usual manner, the end of the crank 8 carrying the crusher or compressor member 11 and passing through the medial helical winding 9 formed by an elastic round wire 10 the ends of which extend rectilinearly to engage the lugs 2.

When the grid is to be positioned and the ridges of its polygonal flange 6 engage the flat surfaces of the shell or body 3, the grid executes automatically a helical downward movement that leads it into the correct position illustrated in Fig. 1.

The above-described arrangement is obviously not limited to the application disclosed and is applicable generally speaking to all implements including a container body and a removable bottom adapted to be held against rotation with reference to the container body and in particular to all household implements used for sifting, mincing and crushing foodstuffs.

What I claim is:

1. A household device for comminuting foodstuff, including a container the main body of which is circular in transverse section, a compression member and a removable self-positioning, perforated bottom; wherein the lower portion of said container is shaped to form an inverted frustum of a pyramid and said bottom is bounded by an upturned flange of complementary shape adapted to nest in said frustum, whereby said bottom may be automatically positioned and held against rotation with respect to the container body.

2. A household device for comminuting foodstuff, including a container the main body of which is circular in transverse section, a compression member and a removable self-positioning, perforated bottom; wherein the lower portion of said container is shaped to form an inverted frustum of a pyramid having at least five sides, and said bottom is bounded by an upturned flange of complementary shape adapted to nest in said frustum, whereby said bottom may be automatically positioned and held against rotation with respect to the container body.

3. A household device as claimed in claim 1, wherein the lower portion of said container terminates in an inwardly directed flange which underlies the outer portion of said bottom.

4. A household device as claimed in claim 2, wherein the lower portion of said container terminates in an inwardly directed flange which underlies the outer portion of said bottom.

RENÉ CHARLES ROI.

REFERENCES CITED

The following references are of record in the file of this patent:

UNITED STATES PATENTS

| Number | Name | Date |
|---|---|---|
| 359,144 | Fisher | Mar. 8, 1887 |
| 839,317 | Rapoport | Dec. 25, 1906 |
| 879,440 | Carothers | Feb. 18, 1908 |
| 1,239,834 | Smith | Sept. 11, 1917 |
| 2,074,794 | Mantelet | Mar. 23, 1937 |

FOREIGN PATENTS

| Number | Country | Date |
|---|---|---|
| 640,660 | Germany | Jan. 9, 1937 |